(Model.)

W. D. HARRIS.
Muzzle.

No. 237,109.

Patented Feb. 1, 1881.

Witnesses:

Inventor
Wm. D. Harris

UNITED STATES PATENT OFFICE.

WILLIAM D. HARRIS, OF BARTON, ALABAMA.

MUZZLE.

SPECIFICATION forming part of Letters Patent No. 237,109, dated February 1, 1881.

Application filed October 7, 1880. (Model.)

*To all whom it may concern:*

Be it known that I, WILLIAM D. HARRIS, a citizen of the United States, residing at Barton, in the county of Colbert and State of Alabama, have invented certain new and useful Improvements in Stock-Muzzles; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in muzzles for herbivorous animals, and its objects are to enable animals wearing it to graze freely, and at the same time to afford protection to growing corn, cotton, small grain, and fruit-trees against the depredations of said animals by nibbling.

Figure 1:
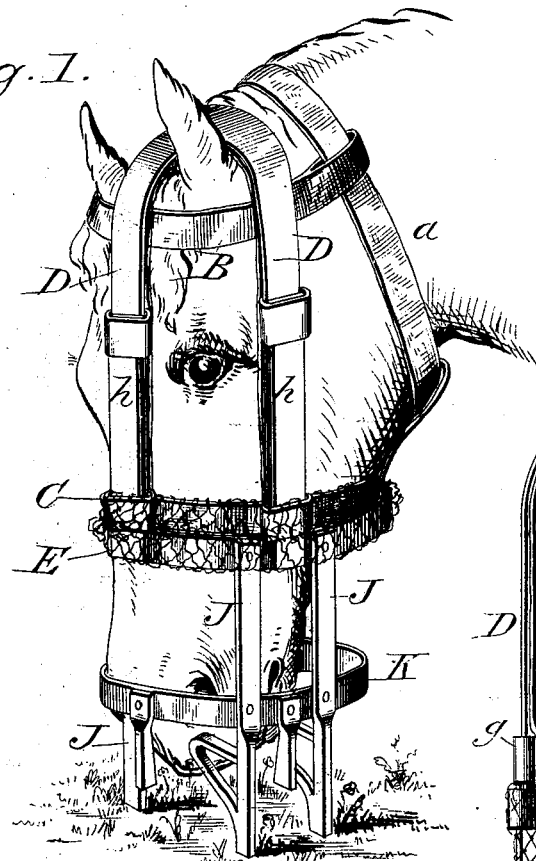
Figure 2:
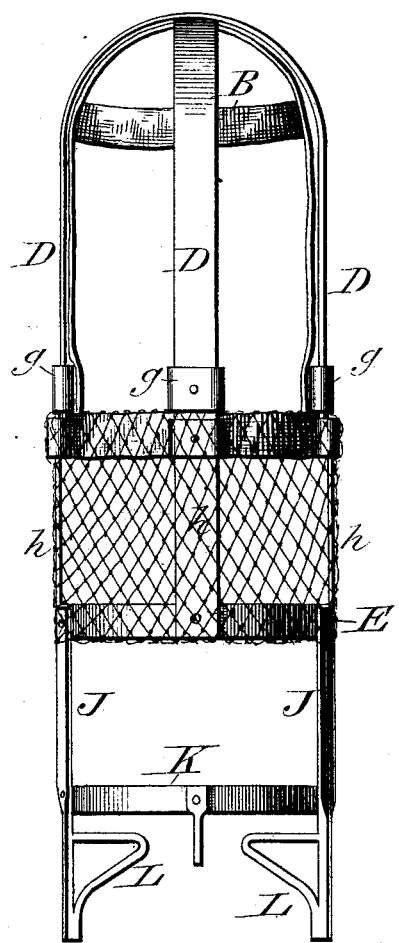

Figure 1 represents my invention in use on a horse and its position while the animal is grazing. Fig. 2 represents it when the animal is not grazing and the position in which it protects grain and fruit-trees.

The pieces A, B, C, and D are made of leather, and are similar in all respects to an ordinary halter or headstall.

The hoop or band E is made of wood, iron, or any firm material, corresponding in diameter to the band C, and to which are firmly riveted three vertical strips of wood, $h\,h\,h$, about twelve inches in length, corresponding in their position to the suspending-straps D D D.

Band C is made of two strips of leather stitched together; but at the points where straps D D D are fastened an opening is left, through which strips $h\,h\,h$ pass freely, and which in their sliding movement are made to follow straps D D D by loops $g\,g\,g$. The space between bands C and E is covered with a net-work of cord, or a piece of canvas, or any light material that will fold readily and not obstruct the working of the vertical strips $h\,h\,h$ in their sliding movement up and down.

The legs J J J are made of wood and riveted to band E, and are kept in position and equi-distant from each other by hoop K, also made of wood or any inflexible material. The function of legs J J J is to close the net-work and enable the animal to feed, and they should be made of a material of sufficient weight to unfold the net-work when the animal lifts its head. The projecting pieces L L L are intended to crowd the grass toward the animal's mouth.

What I claim, and desire to secure by Letters Patent of the United States, is—

1. The combination, in a stock-muzzle, of hoops K and E, legs J J J, bars $h\,h\,h$, loops $g\,g\,g$, and net-work of any suitable material between hoops E and C, with an ordinary halter, D, B, and A, as substantially set forth.

2. In a stock-muzzle, the combination, with a common halter or headstall, of legs J J J, hoops K and E, and band C, with a suitable netting between band C and hoop E, and projecting pieces L L L, as substantially described.

In testimony whereof I affix my signature in presence of two witnesses.

WILLIAM D. HARRIS.

Witnesses:
　WILLIAM C. LEE,
　POLE NUNAN.